T. N. SHAW.
CUTTING MACHINE.
APPLICATION FILED NOV. 8, 1910.

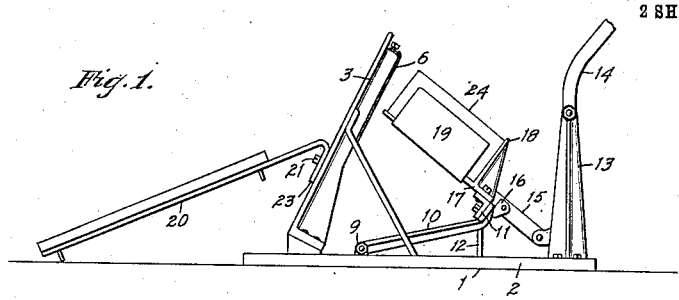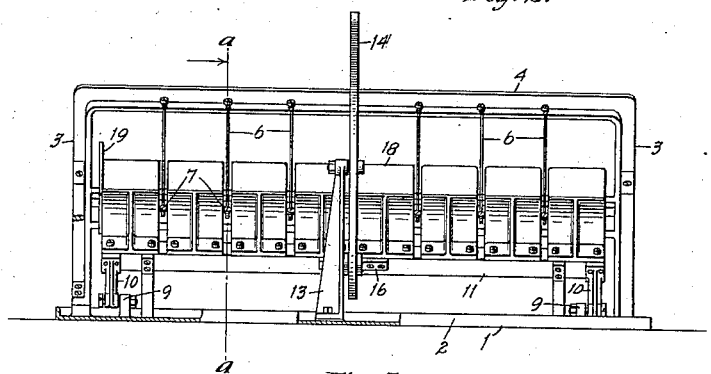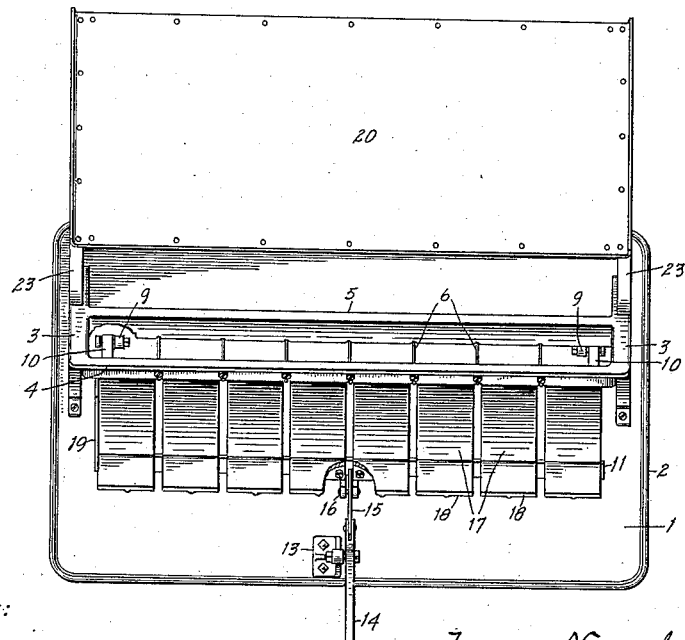

1,013,903.

Patented Jan. 9, 1912.

2 SHEETS—SHEET 2.

Witnesses:
W. L. Dow
E. Behel.

Inventor:
Tracy N. Shaw
By A. O. Behel
Atty.

UNITED STATES PATENT OFFICE.

TRACY N. SHAW, OF ROCKFORD, ILLINOIS.

CUTTING-MACHINE.

1,013,903. Specification of Letters Patent. Patented Jan. 9, 1912.

Application filed November 8, 1910. Serial No. 591,317.

*To all whom it may concern:*

Be it known that I, TRACY N. SHAW, a citizen of the United States, residing at Rockford, in the county of Winnebago and State of Illinois, have invented certain new and useful Improvements in Cutting-Machines, of which the following is a specification.

The object of this invention is to construct a cutter for brick ice cream which comprises stationary cutters and a movable rack which carries the ice cream past the cutters and delivers it onto a suitable platform.

Figure 4:
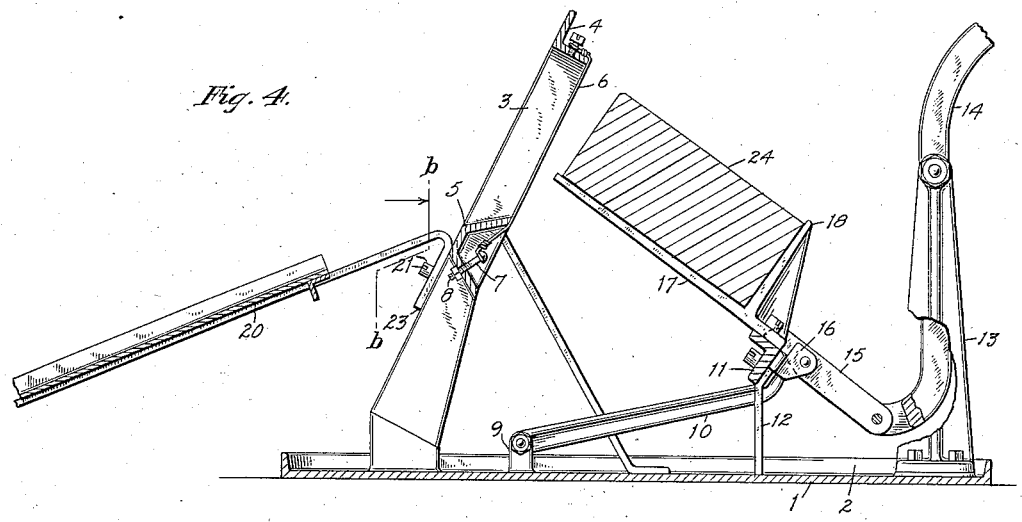
Figure 5:
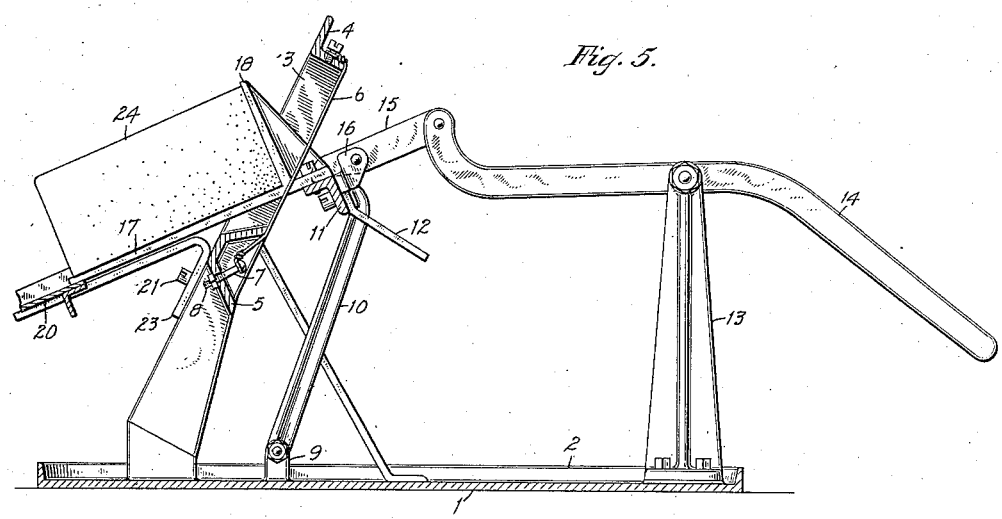
Figure 6:
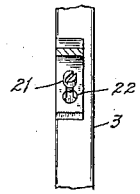

In the accompanying drawings, Figure 1 is an end elevation. Fig. 2 is a rear elevation. Fig. 3 is a plan view. Fig. 4 is a transverse section on dotted line $a\ a$ Fig. 2, in which the parts are in their normal positions. Fig. 5 is a transverse section on dotted line $a\ a$ Fig. 2 in which the parts are in their moved position. Fig. 6 is a section on dotted line $b\ b$ Fig. 4.

The base 1 has upturned edges 2, and to one side of the base is fixedly connected a frame composed of the end bars 3, top-cross-bar 4 and intermediate cross-bar 5. Cutting wires 6 have their upper ends connected to the top cross-bar 4, and their lower ends are connected to screw-threaded studs 7 which pass through the intermediate cross-bar 5, and receive nuts 8 on their projecting ends. By means of the nuts 8, the wires can be tightened. These wires incline with respect to the base. From the base extend two ears 9 to which are pivoted links 10. These links 10 are connected to an angle bar 11, and stops 12 depend from the angle bar. From the base rises a standard 13 to which is pivoted a hand lever 14, and a link 15 has one end connected to the hand lever and its other end is pivotally connected to a bracket 16 connected to the angle bar. To the angle bar are connected a plurality of racks, and each rack comprises a base plate 17, and a back section 18 located at right angles to one another. One of the racks has an end 19. To the end bars 3 of the frame is removably connected a platform 20 by the screws 21 passing through the slots 22 in the arms 23 extending from the platform. The upper edge of this platform is located adjacent to the intermediate cross-bar 5.

In use the racks are in the positions shown at Figs. 1 and 4. A cake 24 of ice cream as it comes from the freezer is placed on the racks with one end against the end 19 of the end rack, which will locate the cake within the support. By moving the hand lever, the racks will be tipped forward which will bring the ice cream cake in contact with the cutting wires 6 which will sever the cake into bricks the size of the racks, as the racks are separated sufficiently to permit them passing the cutting wires. After the cake of ice cream has been cut into bricks, the lever is moved a little further which will move the racks into the positions shown at Fig. 5, which will place the bottoms of the racks on an incline and bring their free edges over the upper edge of the platform 20 which will permit the bricks of ice cream to slide free of the racks onto the platform which is also on the incline from which they slide onto a suitable table. The single movement of the hand lever will raise the cake of ice cream into contact with the cutting wires, cut the cake into bricks and discharge the cut bricks onto the platform.

I claim as my invention.

1. In apparatus of the character set forth, the combination with a base and a plurality of spaced stationary cutters mounted thereon, of a movable material carrier pivoted to the base and comprising a plurality of spaced supporting sections that swing back and forth between the spaced cutters, and means for thus swinging said carrier.

2. In apparatus of the character set forth, the combination with a base, of an upstanding open frame mounted thereon and disposed at an inclination, stationary cutting wires mounted on the frames and spaced apart, a pivoted material carrier mounted on the base and having spaced plates that pass in an edgewise direction between the wires, and means mounted on the base and connected to the carrier for thus moving the same.

3. In apparatus of the character set forth, the combination with spaced cutters, of a movable carrier comprising spaced sections movable between the cutters, a pivoted operating device for the carrier, and a link connection between the operating device and the carrier.

4. In apparatus of the character set forth, the combination with a base, of stationary upstanding spaced cutters mounted thereon, an article carrier pivoted to the base and including spaced plates that are movable between the cutters, a lever fulcrumed on the base, and a link connection between the lever and the carrier.

5. In apparatus of the character described, the combination with spaced cutters, of a platform on one side of the same that inclines downwardly away from said cutters, and an article carrier normally located on the opposite side of the cutters and including spaced sections that are movable between the cutters and into coacting relation with the platform.

6. In apparatus of the character set forth, the combination with spaced cutters, of an article receiving and supporting platform on one side of the same, an article carrier normally located on the opposite side of the cutters and including spaced sections that are movable between the cutters and into overlapping relation with the platform, and means for thus moving the carrier.

7. In apparatus of the character set forth, the combination with a base, of an upstanding inclined frame mounted thereon, spaced cutter wires mounted on the frame, a platform connected to the frame on one side of the same and inclining downwardly away from the same, an article carrier pivoted to the base on the opposite side of the frame and including spaced plates that are movable in an edgewise direction between the wires, a lever fulcrumed on the base, and a link connection between the levers and the carrier.

In testimony whereof I have hereunto set my hand in presence of two subscribing witnesses.

TRACY N. SHAW.

Witnesses:
 A. O. BEHEL,
 E. D. E. N. BEHEL.

---

Copies of this patent may be obtained for five cents each, by addressing the "Commissioner of Patents, Washington, D. C."